United States Patent
Tibbals, Jr.

[11] 3,792,717
[45] Feb. 19, 1974

[54] PRESSURE REGULATOR

[76] Inventor: Edward Camp Tibbals, Jr., 240 Brook Pl., Boulder, Colo. 80302

[22] Filed: June 15, 1972

[21] Appl. No.: 262,992

[52] U.S. Cl......... 137/505.25, 137/505.41, 137/510
[51] Int. Cl........................................... F16k 31/365
[58] Field of Search..... 137/505.25, 505.38, 505.39, 137/505.42, 510

[56] References Cited
UNITED STATES PATENTS

| | | | |
|---|---|---|---|
| 3,606,909 | 9/1971 | Kowalski | 137/510 X |
| 3,472,264 | 10/1969 | Petry | 137/510 X |
| 2,704,551 | 3/1955 | Ralston | 137/505.44 X |
| 85,566 | 1/1869 | Corliss | 137/505.41 |
| 1,927,669 | 9/1933 | Morrow | 137/505.25 |
| 3,664,369 | 5/1972 | Johnson | 137/505.25 |
| 921,272 | 5/1909 | McCarthy | 137/505.25 |
| 734,993 | 7/1903 | Stewart | 137/505.25 |
| 3,224,459 | 12/1965 | Lilly | 137/510 X |

Primary Examiner—Harold W. Weakley

[57] ABSTRACT

A low cost, easily assembled pressure regulator having flow control members operable to move with small incremental changes in output pressure near to a set pressure between fully open and completely closed positions in response to sensed pressure conditions. The pressure regulator of the invention consists of a housing formed in two body sections, which are coupled together and that each contain a structural diaphragm member arranged to deflect as a specially proportioned Belleville spring upon sensing of predetermined pressures. Each diaphragm member may serve as a wall interconnecting an essentially rigid coupling ring and an essentially rigid, interiorly threaded sleeve adapted to be connected into a fluid system. The flow control members moved by the diaphragm members regulate flow through the regulator.

6 Claims, 4 Drawing Figures

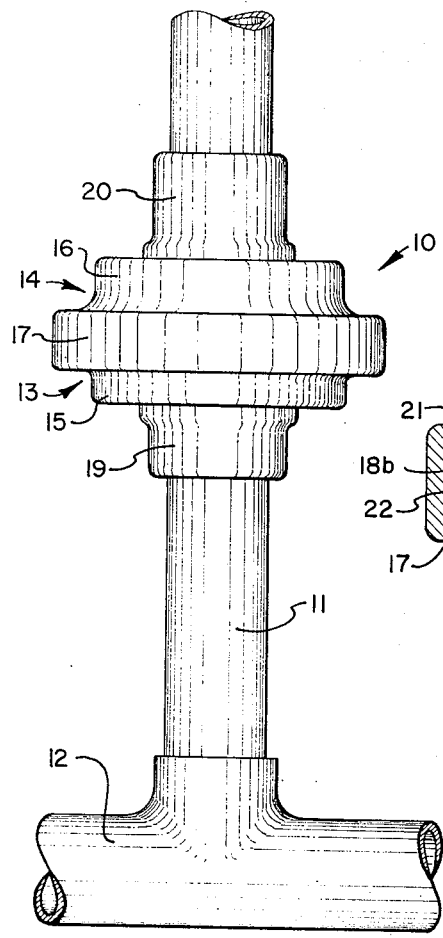
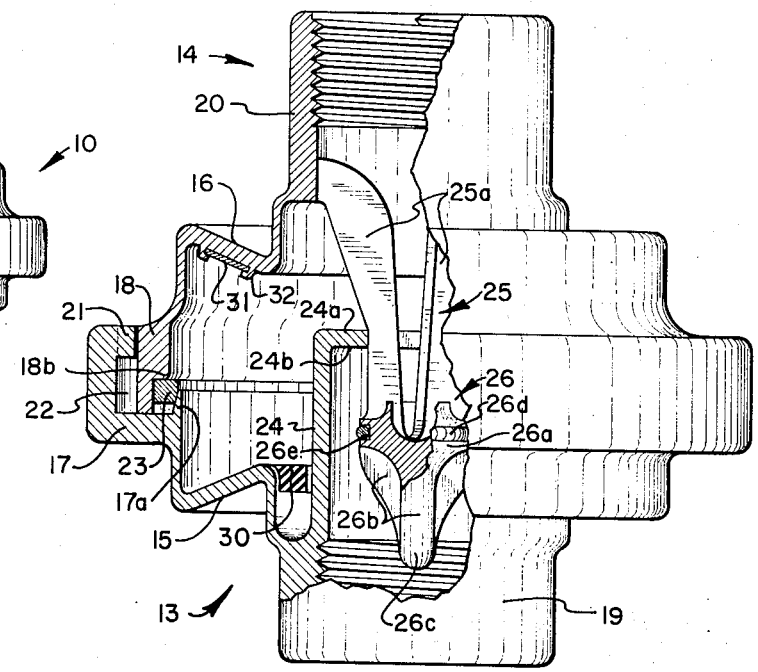
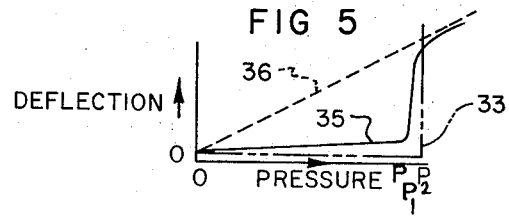
FIG 5

PRESSURE REGULATOR

BRIEF DESCRIPTION OF THE INVENTION

1. Field of the Invention

This invention relates to fluid pressure regulators arranged to open and close in response to the presence of predetermined downstream pressures in a line in which the regulator is placed.

2. Prior Art

Pressure regulators that cut off flow of a liquid when a downstream pressure greater than a predetermined maximum is reached and that open when the downstream pressure has been sufficiently reduced, have long been known. Such regulators have generally included a coil spring that biases a valve head open and a pressure sensing element responsive to excess downstream pressure to close the valve head. The spring, in such an arrangement, is generally gradually compressed by increasing liquid pressure to force the valve head gradually towards a valve seat, until the defined pressure level is reached, whereat the valve head contacts the valve seat to cut off flow. Obviously, as the valve head gradually approaches the valve seat liquid flow through the regulator gradually becomes more restricted. This may be entirely satisfactory for many purposes, but for others it is desired to maintain full flow until the desired maximum downstream pressure has been reached and to then stop flow with minimal further pressure increase and to maintain the flow stopped until the pressure has dropped to a predetermined level after which, in response to minimal further pressure decreases full flow is again permitted.

To the best of my knowledge there has not heretofore been available a pressure regulator which has a non-linear valve position response whereby valve components move only as the pressure closely approaches predetermined set pressure values at which pressure either or both a valve head and a valve seat arrangement quickly move to cut off or restore flow through the regulator. Neither, to my knowledge, has there heretofore been available a pressure regulator which is as simple and reliable while being as inexpensive to produce, as that of the present invention.

SUMMARY OF THE INVENTION

Proper, efficient operation of fluidic devices, such as sprinklers and the like, may require that fluid supplied to the devices be at a substantially constant pressure flow, independent of the volume, and pressure in the line supplying liquid to the device. In the past, it has not been possible to cut off flow when the desired sensed pressure is achieved, while maintaining maximum volume of flow for the longest possible period of time. The pressure regulator of the present invention, however, closely approaches these optimum conditions and is simple to construct from inexpensive materials. Since no springs, weights, sliding components, or the like are incorporated as parts of the invention, consistent operation for a long period of time is obtained.

It is a principal object of the present invention to provide a pressure regulator that will permit a maximum volume of liquid flow therethrough until a defined maximum pressure is sensed, at which point the liquid flow is totally cut off and that will fully open to again permit essentially immediate full volumetric flow when the sensed pressure drops slightly.

Another object is to provide a pressure regulator incorporating a valve head and seat arrangement spring biased by diaphragm members that also serve as structural members of the regulator, formed integrally with structural housing members.

Another object is to provide a pressure regulator wherein the controlling valve head presents a minimum of interference to the liquid passing through the regulator and wherein the head is partially held in its closed position by upstream pressure acting thereon.

Still another object is to provide a pressure regulator that is simple and economical to manufacture in two housing sections that are easily joined and sealed together for use as a regulator in a fluid line and with a pressure compressed seal between the housing sections.

Principal features of the present invention include a pressure regulator formed in two sections of a lightweight, inexpensive and somewhat flexible material. The two sections are arranged to be coupled together by fitting lugs projecting outwardly in spaced arrangement from around the outer edge of one section through interposed openings and beneath adjacent inturned flanges formed in the outer edge of the other section. By rotating the body sections with respect to one another the lugs and flanges are locked together. A ring gasket arranged between the sections and compressed by pressure within the housing provides a tight seal against loss of liquid between the body sections.

Opposing, toggle acting diaphragm members are formed as integral parts of the body sections. Each diaphragm member has a center opening therethrough that allows it to operate as a specially designed, non-linear Belleville spring, flexing in response to a predetermined pressure. A cylindrical valve seat support is connected to the central portion of one diaphragm member and the legs of a spider type valve head support are connected to the central portion of the other diaphragm member. An inturned flange on the valve seat support serves as a valve seat, and a valve head, cooperable therewith is mounted on the valve head support.

When the two sections are joined together, the diaphragm members are in a normally relaxed state, with the valve head positioned within the valve seat support. With the valve head and seat in this position relatively unobstructed flow occurs through the valve seat support around the valve head, through the valve seat, and between the legs of the spider to be discharged through an outlet port.

Should the downstream pressure exceed predetermined amount as determined by the construction of the diaphragm members, the diaphragm members function non-linearly as special Belleville springs, whereby they move the valve seat and the valve head into sealing contact. A sealing ring positioned in a groove of the valve head contacts an inturned flange on the valve seat to shut off liquid flow therethrough.

When the downstream pressure has been reduced sufficiently the diaphragm members resiliently return to their original configuration, moving against the upstream pressure acting on the valve head to open the valve in response to further minimal pressure reduction below the predetermined reduced operating pressure.

Additional objects and features of the invention will become apparent from the following detailed description and drawings disclosing what is presently contemplated as being the best mode of the invention.

THE DRAWINGS

FIG. 1 is a side elevation view of a pressure regulator, typically installed in a riser pipe of a sprinkler system, the sprinkler nozzle, not shown, being normally positioned on the upper end of the riser pipe;

FIG. 2, an enlarged view of the pressure regulator of FIG. 1, with a portion of the housing broken away to expose the regulator interior;

FIG. 3, a perspective view looking into the interior of one of the body sections of the regulator;

FIG. 4, a view like that of FIG. 3, but looking into the interior of the other body section of the regulator; and FIG. 5, a comparison chart showing a desired deflection curve, the deflection curve of the usual coil spring regulator and the deflection curve of the present invention.

DETAILED DESCRIPTION

Referring now to the drawings:

In the illustrated preferred embodiment, the pressure regulator, shown generally at 10, in FIG. 1, is mounted in an upstanding riser pipe 11 that has one end connected to a water source 12, and that has a sprinkler nozzle, not shown, on its other end. In this combination, the pressure regulator is free to expand vertically in response to pressure accumulation downstream of the regulator, as will be explained. It will become apparent that when the pressure regulator is to be installed in the other systems, some means must be provided to allow for necessary expansion of the regulator. For example, a compensating or neutralized expansion coupling or a flexible hose may be used to insure proper pressure regulator operation.

The pressure regulator 10 is constructed of two body sections 13 and 14 that are arranged to be coupled and sealed together. Each body section, is formed with a diaphragm member-wall 15, 16 interconnecting a substantially rigid coupling ring 17, 18 and an essentially rigid, interiorly threaded sleeve 19, 20. The ring 17 has spaced flanges 21 projecting inwardly therefrom. The ring 18 has spaced lugs 22 projecting outwardly therefrom, and the spaced lugs 22 are adapted to be inserted through the openings between the spaced flanges 21 and to be turned therebeneath, thereby locking the body sections together. A seal ring 23 is compressed between the ring 18 and an upwardly extending portion 17a of the ring 17 to prevent liquid loss between the body sections. Ring 18 is curved at 18b and extends only partially over the seal ring 23 so that pressure fluid in the regulator acts on the upper surface of the ring to wedge and compress it into even more effective sealing engagement with rings 17 and 18.

A cylindrical extension 24 of the interiorly threaded sleeve 19 extends into the space formed by the ring 17 and connects diaphragm member-wall 15 to serve as a valve seat support. The end 24a of extension 24 opposite to sleeve 19, is turned inwardly to form a valve seat 24b, as will be hereinafter explained.

The legs 25a of a spider, shown generally at 25, interconnect the interiorly threaded sleeve 20 and a valve head, shown generally at 26. The spider 25 extends into and through the space formed between ring 18 and diaphragm member-wall 16, such that the head 26 will project through the inturned end 24a of cylindrical extension 24 when the body sections 13 and 14 are coupled together.

Valve head 26 includes an enlarged portion 26a dimensioned to closely fit through the opened inturned end 24a and curved ribs 26b extending from the enlarged portion 26a to a central junction 26c. The curved configuration of the ribs 26b allows ready insertion of an O-ring 26d into a groove 26e formed peripherally around the enlarged portion 26a. With this construction the O-ring 26d can be rolled onto the valve head after the body sections 13 and 14 have been coupled together, by reaching through interiorly threaded sleeve 19. The O-ring 26d will mate with the valve seat 24b, in a manner to be hereinafter explained, to cut off flow through the regulator.

In a typical operation, the sleeve 19 is connected into a fluid supply line, shown in FIG. 1 as being the riser pipe 11 of a sprinkler irrigation system. A continuation of the riser is connected into sleeve 20 and the sprinkler nozzle, not shown, is positioned at the upper end of the riser. When fluid under pressure is applied to riser pipe 11 the flow is through sleeve 19, between the legs 25w of spider 25, through sleeve 24 and the inturned end 24a thereof, and through sleeve 20 and riser pipe 11. If the pressure downstream of the regulator exceeds that for which the diaphragm member-walls 15, 16 are designed, that pressure acts against the diaphragms to force them apart. As the diaphragms move apart, the valve head 26 is moved within the cylindrical extension 24 until O-ring 26d engages valve seat 24b, thereby cutting off flow through the regulator. The upstream pressure then acts against the valve head 2 to help hold it in its sealed position. When the downstream pressure has been relieved, as a result of liquid having been discharged through the sprinkler nozzle, the diaphragm member-walls 15 and 16 will return to their original position, and will again move the valve head off the valve seat.

The diaphragm member-walls 15 and 16 each surround and radiate outwardly from their attached interiorly threaded sleeve and are constructed to act as non-linear, self-returning Belleville springs. Accordingly, there is very little deflection of the diaphragms as pressure changes occur, until such time as the absolute pressure approaches the set deflection pressure. When the pressure acting on the diaphragms reaches the predetermined maximum amount, the diaphragms deflect markedly with further small incremental pressure increases until they are fully deflected and they then remain in their deflected or inverted condition until the pressure drops below a predetermined minimum set regulator pressure. The predetermined minimum pressure will, of course, be below the predetermined maximum pressure, since the upstream pressure applied to the valve head must also be overcome before the diaphragms will move back to their original position. After the downstream pressure reaches the pre-set minimum the inherent resiliency of the diaphragms causes them to deflect markedly with further small incremental pressure decreases until they are fully returned to their original configuration.

Since the diaphragm member-walls 15 and 16 also serve as wall structure of the housing, it is apparent that the regulator of the invention must be housed in a system that will allow expansion of the regulator as pressure changes occur. Thus, as used in a sprinkler irrigation system, the portion of the riser above the regulator is free to move as the diaphragms deflect.

In order to achieve the desired deflection of the diaphragm member-walls 15, 16, it has been found necessary to construct the diaphragms with an outside diameter to inside diameter ratio of at least 2:1, and, because the inner and outer edges of the diaphragms are integral with their supporting structures the diaphragms deflect like a simple beam, with the greatest deflections occuring at the inside diameters which are connected to the threaded sleeves 19 and 20 and to the valve head and valve seat. The diaphragms include substantially parallel extending inner and outer rings, interconnected by a central portion that acts as a toggle member during diaphragm deflection. The composite diaphragm thus has a Z-shaped cross-section. The central portion and the connections of the central portions to the inner and outer rings are made significantly thicker than the inner and outer rings to insure proper deflection and to prevent diaphragm rupture. The relative thickness of the central section to the inner and outer rings determines the pressures at which the diaphragm will flex, for any particular material used in their construction.

If desired, a restraining ring such as is shown at 30, FIG. 2, can be positioned inside the inner wall of each inner ring of the diaphragms to prevent inward collapsing or inward deflection of the inner ring. Also, it may be desirable to provide a backing plate 31, FIG. 2, or other reinforcement structure to the central portions of the diaphragms. The backing plate may be snapped beneath lugs 32 formed on either the inner or the outer face of the diaphragm to add rigidity thereto. The backing plate can be of metal or a suitable plastic, for example, and can be of one piece or several pieces.

With the regulator of the invention the diaphragms will deflect non-linearly, as shown by curve 35, FIG. 5. Thus, as the pressure acting on the diaphragms increases from O to P, there is very little initial diaphragm deflection. This continues until the pressure at which the diaphragms are designed to flex is reached, i.e. pressure $P_1$. Thereafter, the diaphragms will flex rapidly during the relatively small incremental pressure increase from $P_1$ to $P_2$. The deflection curve 35 of the diaphragms thus much more closely approaches the theoretical desired curve shown at 33 than does the deflection curve of the usual, coil spring operated pressure regulator, as shown by curve 36.

Although a preferred form of my invention has been herein disclosed, it is to be understood that the present disclosure is made by way of example and variations are possible without departing from the scope of the hereinafter claimed subject matter, which subject matter I regard as my invention.

I claim:

1. A pressure regulator comprising
    a housing including two body sections, each having a substantially rigid sleeve opening thereinto, a substantially rigid ring of larger diameter than said sleeve and diaphragm means interconnecting the sleeve and the ring as a wall of the body section and arranged to deflect non-linearly as a Belleville spring;
    means for coupling said body sections together at the said rings, whereby a chamber is formed between the diaphragm means of the said body section;
    an extension of one sleeve extending into the chamber and having a valve seat formed thereon;
    a valve head carried by the other sleeve, said valve head being arranged to engage said valve seat and to prevent flow through the sleeves when the diaphragm means are deflected apart in response to sufficient pressure accumulation in the chamber.

2. A pressure regulator as recited in claim 1, wherein the means for coupling the body sections together includes
    a plurality of spaced lugs extending from the ring of one body section;
    a plurality of spaced flanges turned inwardly from the ring of the other body section, whereby the lugs are adapted to be inserted between the flanges and to be locked between the flanges and the ring of said other body section.

3. A pressure regulator as recited in claim 2, further including
    a sealing gasket positioned between the rings of the body sections to fully seal the connection between the body sections.

4. A pressure regulator as recited in claim 1, wherein the valve head is carried by the legs of a spider fixed to the sleeve, said legs extending through the valve seat.

5. A pressure regulator as recited in claim 4, wherein the valve head further includes
    a sealing ring in a peripheral groove of the valve head, said sealing ring being arranged to engage the valve seat when said diaphragm means are flexed apart.

6. A pressure regulator as recited in claim 5, wherein the valve head is tapered away from the spider, whereby the sealing ring is readily rolled into the peripheral groove.

* * * * *